(12) United States Patent
Pajukoski et al.

(10) Patent No.: US 9,877,335 B2
(45) Date of Patent: Jan. 23, 2018

(54) HALF-DUPLEX COMMUNICATION IN A NETWORK

(71) Applicant: NOKIA SOLUTIONS AND NETWORKS OY, Espoo (FI)

(72) Inventors: Kari Pekka Pajukoski, Oulu (FI); Esa Tapani Tiirola, Kempele (FI); Eeva Lahetkangas, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 15/114,668

(22) PCT Filed: Jan. 30, 2014

(86) PCT No.: PCT/EP2014/051776
§ 371 (c)(1),
(2) Date: Jul. 27, 2016

(87) PCT Pub. No.: WO2015/113598
PCT Pub. Date: Aug. 6, 2015

(65) Prior Publication Data
US 2016/0353466 A1 Dec. 1, 2016

(51) Int. Cl.
| | |
|---|---|
| H04W 72/12 | (2009.01) |
| H04W 76/02 | (2009.01) |
| H04L 5/16 | (2006.01) |
| H04W 72/04 | (2009.01) |
| H04W 84/04 | (2009.01) |

(52) U.S. Cl.
CPC ............ *H04W 72/121* (2013.01); *H04L 5/16* (2013.01); *H04W 72/0446* (2013.01); *H04W 76/023* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 5,862,142 A | 1/1999 | Takiyasu et al. | |
| 9,282,558 B2* | 3/2016 | Seo | H04B 7/2656 |
| 9,622,279 B2* | 4/2017 | Dimou | H04W 76/023 |
| 2012/0327760 A1 | 12/2012 | Du et al. | |
| 2014/0094183 A1* | 4/2014 | Gao | H04W 72/048 |
| | | | 455/450 |

(Continued)

FOREIGN PATENT DOCUMENTS

| | | |
|---|---|---|
| WO | 2012016378 A1 | 2/2012 |
| WO | 2013170482 A1 | 11/2013 |
| WO | 2014003021 A1 | 1/2014 |

OTHER PUBLICATIONS

International Search Report and Written Opinion for International Application PCT/EP2014/051776, dated Dec. 17, 2014, 15 pages.

(Continued)

*Primary Examiner* — Hong Cho
(74) *Attorney, Agent, or Firm* — Brake Hughes Bellermann LLP

(57) ABSTRACT

According to an example implementation, a wireless communication in which user devices belonging to a service group use a first half-duplex time domain resource for sending and receiving messages in the service group and a second time domain resource is used for relaying collided messages.

23 Claims, 3 Drawing Sheets

(56) References Cited

U.S. PATENT DOCUMENTS

2016/0028518 A1* 1/2016 Zhao .................... H04L 1/0028
                                                    370/330
2016/0219632 A1* 7/2016 Wallentin ............ H04W 76/023

OTHER PUBLICATIONS

R1-133349; NEC Group; "Network-assisted Device Discovery mechanism"; 3GPP TSG RAN WG1 Meeting #74; Barcelona, Spain, Aug. 19-23, 2013, Aug. 2013, 6 pages.
R1-135221; Samsung; "Resource allocation for D2D broadcast communication"; 3GPP TSG RAN WG1 Meeting #75; San Francisco, USA, Nov. 11-15, 2013, Nov. 2013, 4 pages.
R1-135592; Nokia, et al.; "Resource allocation, multiplexing and resource access"; 3GPP TSG-RAN WG1 Meeting #75; San Francisco, USA, Nov. 11-15, 2013, Nov. 2013, 6 pages.

* cited by examiner

US 9,877,335 B2

HALF-DUPLEX COMMUNICATION IN A NETWORK

This application is a national stage entry of PCT Application No. PCT/EP2014/051776, filed Jan. 30, 2014, entitled "HALF-DUPLEX COMMUNICATION IN A NETWORK" which is hereby incorporated by reference in its entirety.

FIELD

The present invention relates to wireless communication, and particularly to half-duplex wireless communication.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased a demand for mobile broadband services, and hence more network capacity is required. One possibility to increase network capacity is to deploy in addition to wide area systems local area systems. In a local area system, a typical cell size is small compared with a macro cell, and the number of apparatuses connected to an access point or base station is not large, compared to the macro cell, for example. A local area system can utilize time division duplex (TDD) bands to take advantage of the additional available bandwidth. The local area system may be implemented as a half-duplex, decentralized system in which devices, such as user apparatuses and network nodes, may communicate directly with each other. Since in a half-duplex communication a device may either transmit or receive over a spectrum, and the users require reliable functionality with good capacity not using two much power, a centralized scheduling or a distributed scheduling based on contention based access or sensing cannot fulfill all of them.

SUMMARY

A general aspect of the invention provides a half-duplex mechanism based on providing a first time domain resource that is common to all apparatuses belonging to a service group for transmitting and receiving information from one apparatus to another apparatus.

Various aspects of the invention comprise methods, an apparatus, a computer program product and a system as defined in the independent claims. Further embodiments of the invention are disclosed in the dependent claims.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplifying. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any access network/system and apparatus that can be or are configured to support time division duplex (TDD) based communication over half-duplex communication links. Examples of such access systems/networks include LTE (Long Term Evolution) access system, Worldwide Interoperability for Microwave Access (WiMAX), Wireless Local Area Network (WLAN), LTE Advanced (LTE-A), and beyond LTE-A, such as 5G (fifth generation). The specifications of different systems and networks, especially in wireless communication, develop rapidly. Such development may require extra changes to an embodiment. Therefore, all words and expressions should be interpreted broadly and they are intended to illustrate, not to restrict, the embodiment.

Below different exemplifying embodiments are explained using a local area scenario employing frame based TDD, without limiting the examples and the invention to such a solution.

Figure 1:
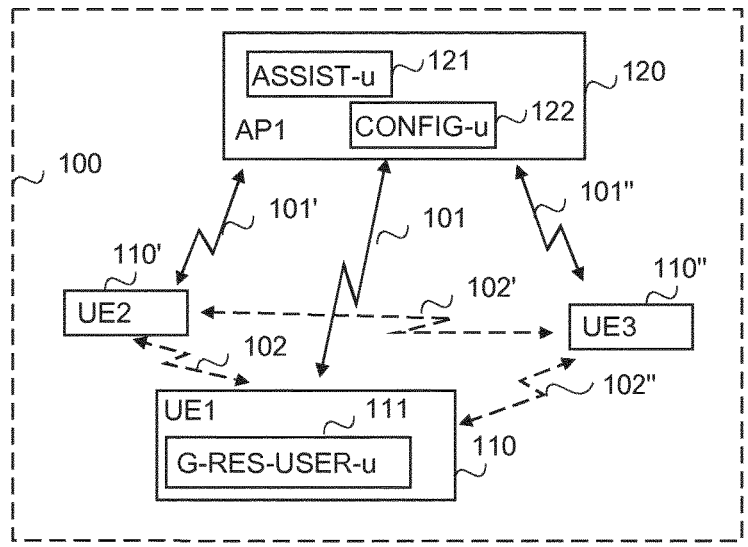
FIG. 1 shows simplified architecture of a system and block diagrams of some apparatuses according to an exemplifying embodiment.

A general architecture of an exemplifying local area system 100 is illustrated in FIG. 1. FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplifying local area system 100 illustrated in FIG. 1 comprises user devices 110, 110', 110" and access points 120 (only one illustrated in FIG. 1) providing conventional connections 102, 102', 102" between the user devices 110, 110', 110" and the access point 120 in both directions, and in addition to that direct communications between the apparatuses (also called nodes), i.e. communications 101, 101', 101" between user devices and communications (not illustrated in FIG. 1) between access points.

In the exemplifying local area system 100 the user devices 110, 110', 110" and the access point are connected to a network (not illustrated in FIG. 1), each of them has a unique node identity and they have been organized into at least one service group. It suffices that the node identities are unique within a service group. However, the node identities may be unique within a specific part of a network, within a network, within a system, or globally. If/when an apparatus changes from a service group to another, its node identity may change. If the apparatus belongs to two or more service groups, it may have different identities for different groups, as many node identities as there are service groups the apparatus belongs to, or the same node identity may be used in some of the service groups but not in all service groups the apparatus belongs to. Examples of unique identities include physical apparatus identities, like physical cell identity PCI in LTE, and cell radio network temporary identifier C-RNTI in LTE. Further, dedicated symbol sequences may be used as unique identities: the receiving apparatus (target apparatus) correlates a predetermined point in a message with a symbol sequence allocated to the apparatus, and if the correlation exceeds a predetermined value, the apparatus determines that the message is targeted to the apparatus.

The user equipment (UE) 110, 110', 110" refers to a wireless computing device (apparatus), and it may be a user terminal or user device or a machine-type-communication (MTC) device, also called Machine-to-Machine device and peer-to-peer device. Such computing devices (apparatuses) include wireless communication devices operating with or without a subscriber identification module (SIM) in hardware or in software, including, but not limited to, the following types of devices: mobile phone, smart-phone, personal digital assistant (PDA), handset, laptop computer, e-reading device, tablet, phablet, game console, sensor, actuator, video camera, car, refrigerator, other domestic appliances, telemetry appliances, and telemonitoring appliances. The user equipment 110 is configured to support TDD with distributed scheduling. For that purpose the user equipment 110 comprises a group resource user unit 111 (G-RES-USER-u) whose functionality will be described in more detail below.

In the example of FIG. 1, the access point 120 depicts an apparatus providing access to the network the user devices and the access point are connected to. Examples of such apparatuses include a WLAN access point, like a Wi-Fi hot spot, a wireless personal area network (WPAN) access point, a free-space optical communications access point using infrared, a WiMAX access point, an evolved node B and a base station. In the example, the access point 120 is configured to support TDD with distributed scheduling. For that purpose the access point 120 comprises a configuration unit 122 (CONFIG-u) that is configured to allocate a first time domain resource, like a slot, to each its service group, and correspondingly a second time domain resource for each first time domain. Further, in the illustrated example, the access point is configured to assist TDD with distributed scheduling. For that purpose the access point comprises an assisting unit 121 (ASSIST-u) whose functionality will be described in more detail below.

It should be appreciated that a user device may comprise also an assisting unit and/or a configuration unit, and an access point may comprise also a group resource user unit, and/or an access point may be implemented without the configuration unit. Each apparatus comprising an assisting unit may act as an assisting apparatus.

The first time domain resource may be configured by the access point, by a cluster head, by a network in which case the information is forwarded to user devices belonging to the service group via the access point, for example, or the first time domain resource may be a preset resource in the user equipment. In other words, any way to determine and configure the first time domain may be used. The same applies to the second time domain resource. Further, the first time domain resource may be determined and configured using a different way or the same way than what is used with the second time domain.

In the example of FIG. 1, the local area system 100 depicts a system supporting device-to-device communication that is a form of peer-to-peer networking. There is a wide variety of such systems. Examples of such systems include mobile communications systems, Internet of Things systems, wireless sensor network systems, proximity based service systems, public warning systems, public safety systems supporting direct device-to-device communications, cyber-physical systems (CPS). Internet of Things connects different sources of information such as sensors, mobile phones and cars that consume and process information in different environments such as logistic applications, factories and airports as well as in the work and everyday lives of people. A cyber-physical system is a system of collaborating computational elements controlling physical entities. Examples of cyber-physical systems include mobile robotics and electronics transported by humans or animals. A real-world example of such a system is the Distributed Robot Garden at MIT (Massachusetts Institute of Technology) in which a team of robots tend a garden of tomato plants. This system combines distributed sensing (each plant is equipped with a sensor node monitoring its status), navigation, manipulation and wireless networking.

There are several ways to organize user devices into service groups, and any way may be used. For example, a service group may be a predetermined service group, and information relating to the service group, such as node identities, the first time domain resource, and the second time domain resource may be stored to one or more user devices belonging to the predetermined service group. Alternatively, a service group may be determined on fly, or both above-mentioned ways may be combined. In proximity based services that are based on awareness that two devices or two users are close to each other, a discovery procedure may be used for determining members of a service group. In one discovery procedure, called Type 1, resources for discovery signal transmission are allocated on a non user equipment specific basis, and the resources may be for all user devices or for a group of user devices. In another discovery procedure, called Type 2, resources for discovery signal transmission are allocated on a per user equipment specific basis, either for each specific transmission instance of discovery signals or semi-persistently for discovery signal transmission.

Below different examples are described assuming that each apparatus (node) is aware of node identities of other apparatuses in the same service group. The identity information is needed for the direct communication (device-to-device, D2D) messages, like scheduling requests and small data packets. However, if the apparatus is configured to send only to one other apparatus (node) in the service group, or only to some of the apparatuses (nodes) in the service group, it suffices that the apparatus is aware of its own node identity and the node identities of the one or more apparatuses the apparatus is configured to send. In the below examples, it is assumed, that an assisting apparatus (node) does not belong to the service group and therefore it does not need to be aware of the node identities. However, the assisting apparatus may be aware of the node identities even when it does not belong to the service group. Naturally, if the assisting node belongs to the service group, it is aware of the node identities. Further, below it is assumed for the sake of clarity that each apparatus belong only to one service group for which a first time domain resource and a second time domain resource have been allocated, and each apparatus is aware of them. When an apparatus belongs to several service groups, the below described functionality is performed for each service group separately.

Figure 2:
FIG. 2 illustrates an exemplifying format for a message requesting access.

FIG. 2 illustrates an example of information intended to be transmitted over the first time domain resource. Examples of such information include different control information and small data packets exchanged between apparatuses. Such information is transmitted by means of addressed messages, an addressed message comprising at least recipient identifying information. In the example of FIG. 2 a message 200 conveying the information contains identification 201 (Target_ID) of one or more receiving apparatuses (nodes) as recipient identifying information, identification 202 (Source-ID) of a transmitting apparatus (node) as sender identifying information, and other information 203. The length of the message 200 may be 40 bits: 16 bits for the identification 201 of the receiving node(s), 16 bits for the identification 202 of the transmitting node, and 8 bits for the other information 203, for example. It should be appreciated that any other length may be used, as long as the length is enough to convey the required information. Preferably but not necessarily, the length is short enough so that the size of the first time domain resource and the second time domain resource can be the smallest assignable unit size, like a slot. However, it should be appreciated that any amount of parallel resources with a fixed time duration, and hence fixed size, may be used. The other information may be any information. Examples of the other information include small data packets and scheduling information, such as an access request, a modulation and coding scheme and a bandwidth allocation. In an implementation a message containing only the identifications 201, 202 (identifiers) is an access request message (ARM). Still in another implementation, an empty other information field 203 indicates that the message is an access request message.

Figure 3:
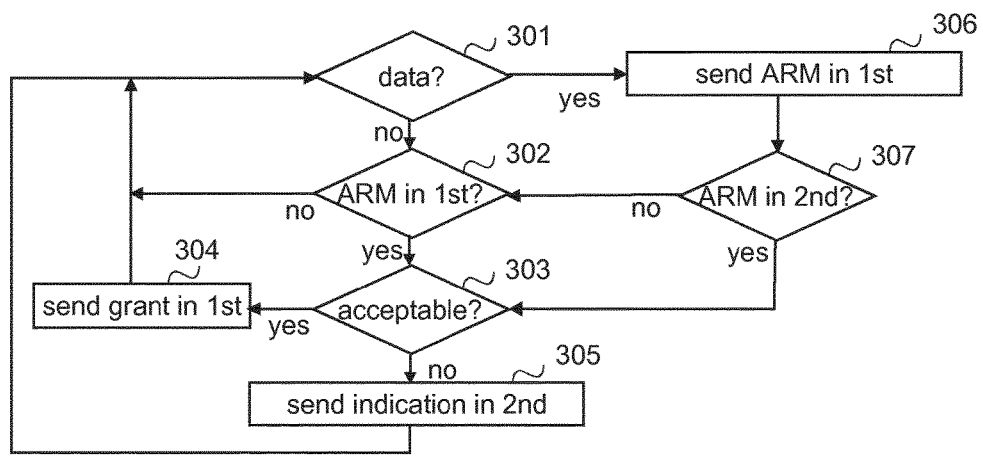
FIGS. 3, 4, 5, 6 and 7 are flow charts illustrating exemplifying functionalities.

FIG. 3 is a flow chart illustrating an exemplifying functionality of a sending and receiving apparatus. More precisely, it describes exemplifying functionality of a group resource user unit. Further, in the illustrated example, an access request message (ARM) is used as an example of the information to be conveyed, without restricting implementations to such messages.

Referring to FIG. 3, the apparatus monitors in step 301, whether or not data to be sent has arrived to its buffer. If there is no data, the apparatus blind decodes (monitors) transmissions on the first time domain resource to find out, whether or not an access request message (ARM) containing the apparatus's identifier as the receiver's identifier (Target_ID) has been sent (step 302). If such a message is not found, the apparatus continues to monitor (step 301) the buffer.

If the first time domain resource contained an access request message targeted to the apparatus (step 302), the apparatus determines in step 303, whether or not the request is acceptable. If the request is accessible, in the illustrated example the apparatus sends in step 304 a grant, i.e. information on the future data transmission. Alternatively, the apparatus may send a message containing resources over which a grant may be sent. Then the process proceeds to step 301 to continue the monitoring of the data buffer and then further access request messages in the first time domain resource. If the request is not acceptable (step 303), for example accepting the request would generate excessive interference, the apparatus sends in step 305 on the second time domain resource an indication indicating that the access request is rejected. Then the process proceeds to step 301 to continue the monitoring of the data buffer and then further access request messages in the first time domain resource.

If there is data in the buffer (step 301), the apparatus sends in step 306 an access request message on the first time domain resource, the access request message containing the recipient's identifier and the apparatus's identifier, as is described above with FIG. 2. Then the apparatus blind decodes next transmission on the second time domain resource to find out, whether or not an access request message (ARM) containing the apparatus's identifier as the receiver's identifier (Target_ID) has been sent (step 307) on the second time domain resource. If not, the process proceeds to step 301 to continue the monitoring of the data buffer and then further access request messages in the first time domain resource. If an access request message (ARM) containing the apparatus's identifier as the receiver's identifier (Target_ID) has been sent (step 307) on the second time domain resource, the process proceeds to step 303 to determine, whether or not the request is acceptable. In other words, in the example in which the arrangement 800 of the time domain resources are arranged as disclosed in FIG. 8, the apparatus monitors the second time domain resource until its ends and the next first time domain resource begins. However, in other examples the apparatus may monitor until the next first time domain resource begins or the second time domain resource ends, or until two or more consecutive second time domain resources end.

Figure 4:
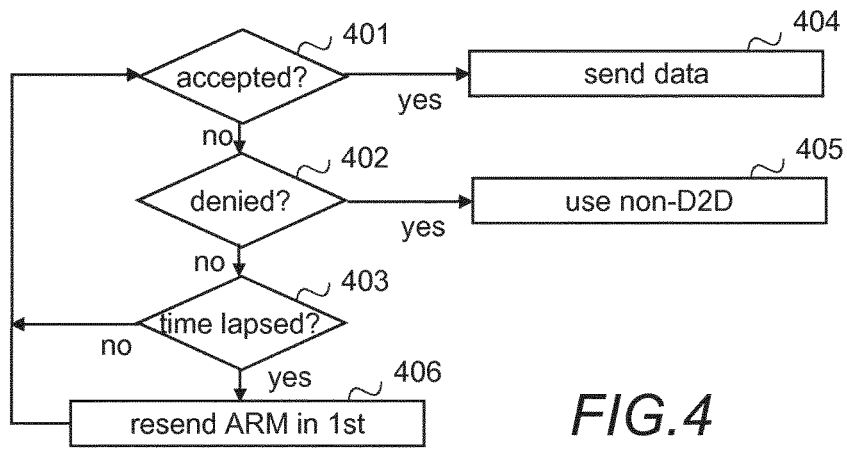

FIG. 4 illustrates an exemplifying functionality of the apparatus after the apparatus has sent an access request message. More precisely, it describes exemplifying functionality of a group resource user unit.

Referring to FIG. 4, when the apparatus has sent an access request message (ARM), the apparatus monitors, whether or not the request is accepted (step 401) or denied (step 402) or whether or not a response is not received within a predetermined time period (step 403). The time period may be the outcome of a duration of a frame used in the wireless transmissions reduced by the duration of the first time domain resource.

If the request is accepted (step 401), the apparatus sends in step 404 the data from the buffer using resources indicated by the information in the grant.

If the request is denied (step 402), the apparatus use in step 405 the non-device-to-device communications to send the data. In other words, the data may be sent via the access point. However, it should be appreciated that in another implementation in step 405 a retransmission of the access request message is tried.

If the time period lapses (step 403), the apparatus resends in step 406 the access request message in the first time domain resource, and starts to repeat the monitoring. When resending the access request message, the apparatus may be configured to use random offset or power ramp up or any other existing contention based access scheme. It should be appreciated that in response to the resending the apparatus blind decodes next transmission on the second time domain resource to find out, whether or not an access request message (ARM) containing the apparatus's identifier as the receiver's identifier (Target_ID) has been sent on the second time domain resource (see step 307 in FIG. 3).

Although in the above example it is assumed, for the sake of clarity, that resending the access request message is continued until a response is received, in another implementations the number of resends may be limited and if no response is received after the limit has been reached, for example after one, two or three resends, the apparatus uses the non-device-to-device communication.

It should be appreciated that the above described ways to send an access request message may be used with distributed scheduling and with centralized scheduling.

Figure 5:
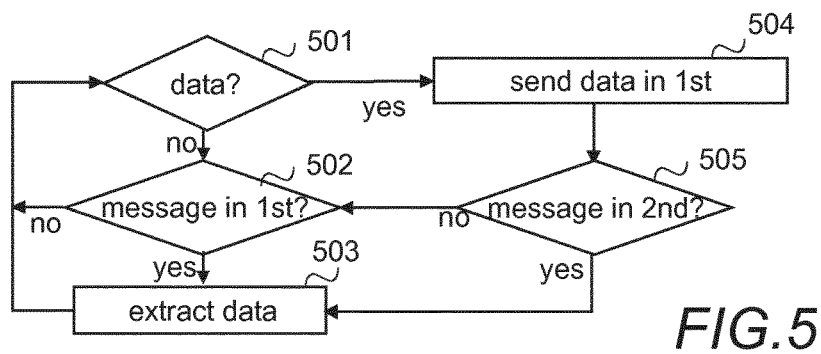

FIG. 5 is a flow chart illustrating an exemplifying functionality of a sending and receiving apparatus. More precisely, it describes exemplifying functionality of a group resource user unit. In the illustrated example the information is data that is either small enough to fit into one message or sent in consecutive messages. Examples of small data (small data packets) include data sent by machine-type communication devices, such as sensors or actuators. The small data may be a temperature value or a fire alarm sent from a sensor, for example. Further, in the illustrated example the data transmission is unacknowledged data transmission.

Referring to FIG. 5, the apparatus monitors in step 501, whether or not there is data to be. If there is no data, the apparatus blind decodes transmissions on the first time domain resource to find out, whether or not a message containing the apparatus's identifier as the receiver's identifier (Target_ID) has been sent (step 502). If such a message is not found, the apparatus continues monitoring (step 501).

If the first time domain resource contained a message targeted to the apparatus (step 502), the apparatus extracts, in step 503, information (data) from the message and forwards the data for further processing. Then the process proceeds to step 501 to continue the monitoring.

If there is data (step 501), the apparatus sends in step 504 the data, or a piece of the data, in a message on the first time domain resource, the message containing the recipient's identifier and the apparatus's identifier, as is described above with FIG. 2. Then the apparatus blind decodes next transmission on the second time domain resource to find out, whether or not a message containing the apparatus's identifier as the receiver's identifier (Target_ID) has been sent (step 505) on the second time domain resource. If not, the process proceeds to step 501 to continue the monitoring. If a message containing the apparatus's identifier as the receiver's identifier (Target_ID) has been sent (step 505) on the second time domain, the process proceeds to step 503 to extract the information.

If the data transmission is an acknowledged transmission, the message targeted to the apparatus may contain the acknowledgement (or a negative acknowledgement).

Thanks to the need to monitor transmission on the second time domain resource only a predetermined, short time period after own transmission on the first time domain resource, i.e. in an exceptional situation for a user equipment in a typical device-to-device communication, reduces power consumption of the user equipment.

Figure 6:
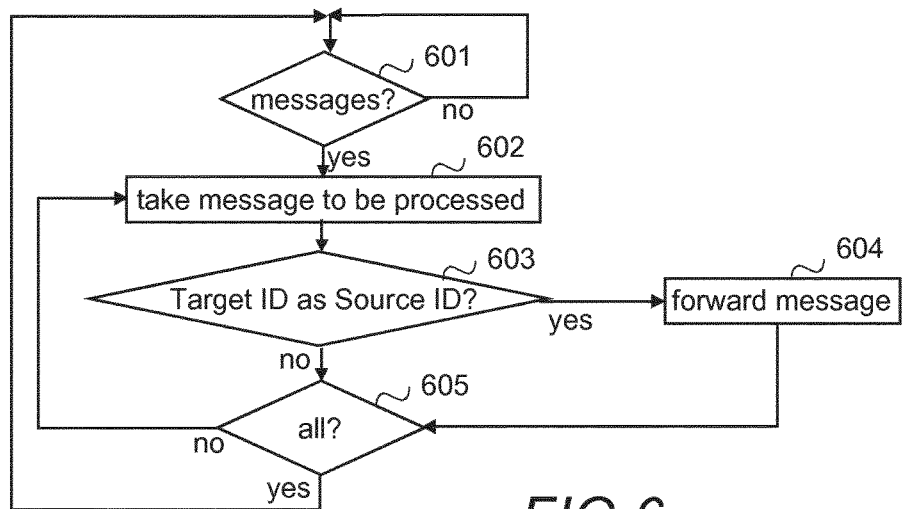

FIG. 6 is a flow chart illustrating an exemplifying functionality of an assisting apparatus. The assisting apparatus may be a user equipment, an access point, or a cluster head. More precisely, it describes exemplifying functionality of an assisting unit. In the example it is assumed, for the sake of clarity, that a collision detection procedure takes less time than a duration of a frame. However, should it take longer, the monitoring and collision detection would be performed simultaneously. For the sake of clarity, steps relating to the assisting apparatus taking temporary copies of the messages sent in the first time domain resource and discarding them are not described in detail. Depending on an implementation, the assisting apparatus may take the copies all the time or in response to detecting that at least two messages are sent in the same first time domain resource.

The assisting apparatus monitors what is sent in first time domain resources. In response to detecting in step 601 that at least two messages are sent in the same first time domain resource, the assisting apparatus performs the collision detection procedure. More precisely, the assisting apparatus takes in step 602 one of the messages to be processed, and checks in step 603 whether or not the receiver's identifier (target ID) is a sender's identifier (source ID) in one of the other messages. If yes, then a collision has happened, and the assisting apparatus forwards (relays) in step 604 the message in the following second time domain resource. Alternatively, the assisting apparatus may send an indication that the small data packet collided, or that an access request will not be accepted due to the collision or a negative acknowledgement to the small data transmission. Then the process proceeds to step 605 to check whether or not the collision detection procedure has been performed to all messages. If not, the process proceeds to step 602 to take another message to be processed.

If the receiver's identifier (target ID) is not a sender's identifier (source ID) in any of the messages (step 603), there is no collision and the assisting apparatus checks in step 605 whether or not all messages are processed.

If all access request messages are processed (step 605), the process proceeds to step 601 to monitor the first time domain.

Figure 7:
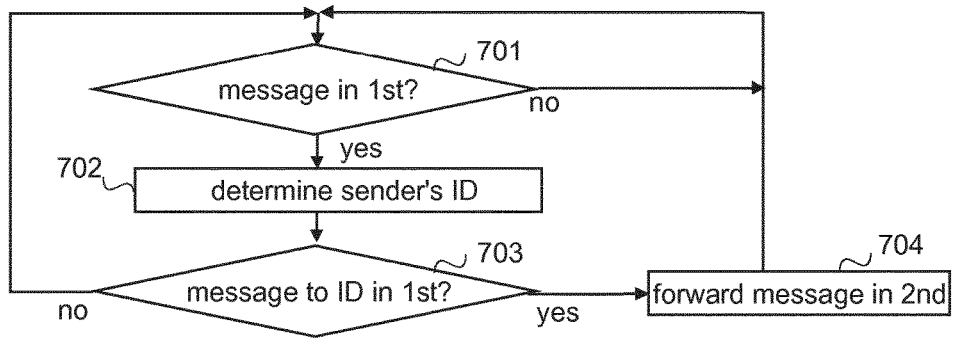

FIG. 7 is a flow chart illustrating another exemplifying functionality of an assisting unit in an assisting apparatus. In the illustrated example, the assisting apparatus monitors messages sent to a user device t that is sending and therefore cannot receive. In other words, collided messages may be monitored, a collided message being a message sent over a first time domain resource to a recipient, or to recipients, who used the same first time domain resource to send a message.

Referring to FIG. 7, the assisting apparatus monitors first time domain resources. In response to detecting in step 701 that a message has been sent in a first time domain resource, an identity (ID) of the user equipment who sent the message is determined in step 702, and then it is checked in step 703, whether or not in the same first time domain resource one or more messages having in the receiver's identifier field (target ID) the identity determined in step 702 has been sent. If yes, each such message is forwarded (relayed) in step 704 in a second time domain resource and the monitoring (step 701) is continued. If in step 703 it is detected that there are no messages targeted to the identity determined in step 702, the process continues the monitoring in step 701.

It should be appreciated that the above process is run in parallel to all messages using the same first time domain resource.

As is evident from the above examples of FIGS. 6 and 7, the assisting unit (apparatus) uses identities in the messages, and therefore it does not need to be aware of the node identities belonging to a service group.

It should be understood that, sending, forwarding, transmitting and/or receiving may herein mean preparing a data transmission and/or reception, preparing a message to be sent, transmitted and/or received, controlling sending, forwarding, transmitting and/or receiving or physical transmission and/or reception itself, etc. on a case by case basis. The same principle may be applied to terms transmission and reception as well.

A scenario describing an exemplifying use situation is illustrated in the table below. In the scenario it is assumed that a service group contains three user devices, identified by a number, and an access point is an assisting node that may belong to the service group or be external to the service group. Further, although in the table ARM is used as an example of a message, it is obvious that ARM may be replaced by small data, or some of the ARMs may be replaces by the small data.

|                | 1st time domain | | | | 2nd time domain |
| --- | --- | --- | --- | --- | --- |
| Resource index | 1 (UE) | 2 (UE) | 3 (UE) | AP | |
| 0 | Rx | Rx | ARM(3->1) | Rx | |
| 1 | ARM(1->2) | Rx | Rx | Rx | |

-continued

| Resource index | 1st time domain | | | | 2nd time domain |
|---|---|---|---|---|---|
| | 1 (UE) | 2 (UE) | 3 (UE) | AP | |
| 2 | Rx | Rx | Rx | Rx | |
| 3 | Rx | ARM(2->1) | Rx | Rx | |
| 4 | ARM(1->2) | ARM(2->3) | Rx | Rx | AP:ARM forward |
| 5 | Rx | ARM(2->3) | Rx | Rx | |
| 6 | Rx | ARM(2->3) | ARM(3->2) | Rx | AP:ARM forward |
| 7 | Rx | Rx | Rx | Rx | |
| 8 | Rx | Rx | Rx | Rx | |

As can be seen from the scenario, a collision takes place in the first time domain resources 4 and 6, in which case the second time domain resource is used to forward the access request messages, in the second time domain resource 4, ARM 1->2 is forwarded, and in the second time domain resource 6, ARM 2->3 and ARM 3->2 are forwarded, since in each case the receiver was sending and hence could not receive the request.

As is evident from the above, having a first time domain resource dedicated to be a common resource within a service group for sending and receiving messages that may contain scheduling related information or small data, and a second time domain resource for forwarding (relaying) message(s) to user equipment(s) that could not receive the message(s) because of a simultaneous sending, the reliability of half-duplex communications is increased, since the collisions are detected within a very short time period, and another resource is used for the non-received message. In other words, the second time domain resource may provide a low latency that is better guaranteed than in a pure contention based access.

The second time domain resources, when they are not used for forwarding access request messages or other scheduling information or small data packets, are available for other purposes, like for sending request rejections described above with step 305 in FIG. 3.

Figure 8:
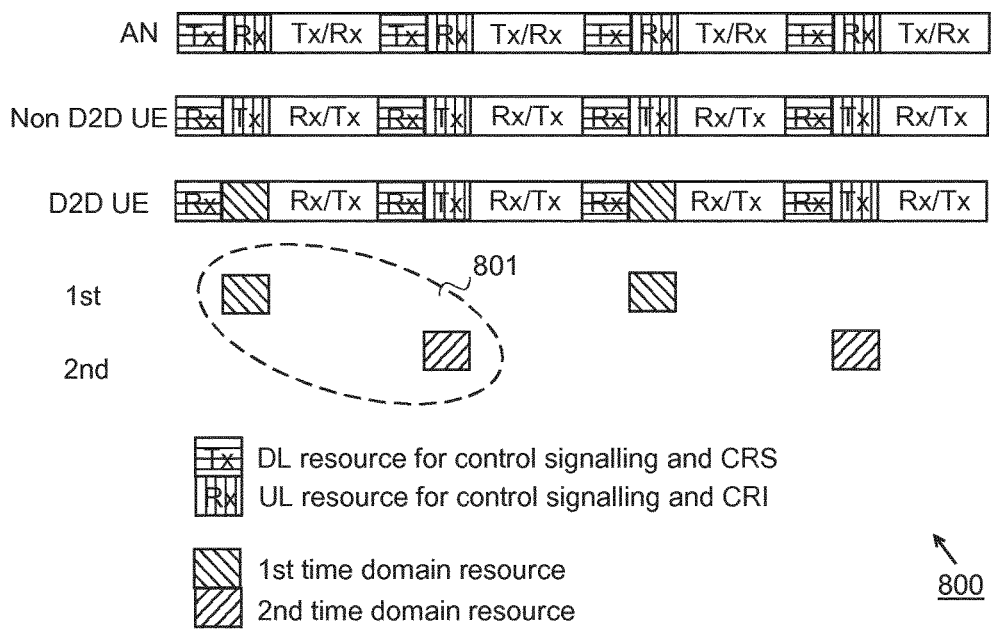
FIG. 8 illustrates an exemplifying arrangement of the time domain resources.

FIG. 8 illustrates an exemplifying arrangement 800 of the time domain resources in an extended local area for 5 G systems. In the exemplifying arrangement it is assumed that an access point acts as an assisting apparatus AN, and that a frame structure applied contains bi-directional control information in the hatched portions and one-directional data (white background). The resources for the one-directional data may be used for transmitting data from a buffer after a grant, a situation explained above with FIG. 3. In the example, the first time domain resources for apparatuses in device-to-device mode (UE D2D) are available in every second sub-frame in the uplink (UL) control information resources, and the second time domain resources reuse existing downlink (DL) control resources in every second sub-frame so that there exists one-to-one mapping of the first time domain resource and the second time domain resource. Hence, the first time domain resource and the second time domain resource form a resource pair 801 of resources positioned in different frames, in the illustrated example in consecutive frames. However, any other fixed time offset between the first time domain resource and the second time domain resource may be used. The same applies to the periodicity of the first and second time domain resources; their periodicity may be the same, or different. For example, the first time domain resource is in each frame whereas the second time domain resource is in every second or third frame. The fixed time offset and/or the periodicity may be configured via a higher layer signaling, or be broadcast or be a predetermined offset preset to the user devices, for example.

Uplink control resources may be for control signaling and a common/cell-specific channel reference signal (CRS), and the downlink control resources for control signaling and channel state information (CSI).

In the illustrated arrangement, device-to-device user equipment (D2D UE) does not have a control connection towards the access point (AN) in the sub-frames allocated to be the first time domain resources. If the control connections in a device-to-device communication should be similar to those in a non-device-to-device communications, instead of allocating the first time domain resources from uplink control resources, they may be allocated from resources reserved for data. Further, although in the illustrated arrangement, the size of the The steps, messages and related functions described above in FIGS. 3, 4, 5, 6 and 7 are in no absolute chronological order, and some of the steps may be performed simultaneously or in an order differing from the given one. For example, steps 301 and 302 are performed simultaneously. Other functions can also be executed between the steps/points or within the steps, and other messages sent. For example, if a collided message contains two or more recipients, and only one (or some) of the recipients could not receive the collided message because it (they) used the same resource for sending, the assisting unit may remove from the recipient identifying information those recipients who were not sending, and hence received the message, before the message is forwarded over the second time domain resource. Naturally the receiving nodes may be configured to check, whether or not the message received via the second time domain resource has already been received over the first time domain resource, and ignore the latter received, if the message is received twice. Some of the steps/messages or part of the steps/messages can also be left out or replaced by a corresponding step/message or part of the step/message.

As is evident from the above, the above described arrangement (use of the first time domain resource and the second time domain resource) provides a trade-off between latency, reliability and system overhead. Typically in a device-to-device communications traffic activity is rather low, i.e. a user equipment has infrequently data to be sent, but when there is data to be sent, sending of the data should happen as fast as possible, the latency should remain low. In prior art solutions, one needs to select amongst dedicated access and contention based access. The dedicated access in which an Rx/Tx resource should be reserved in each, or almost in each, time period (frame), for a user equipment, provides low latency and high reliability but it uses quite a lot of resources and has a high overhead because of reserving the resources. The contention based access has a small overhead but because of contentions the reliability is low and latency may be high. The above described arrangement (use of the first time domain resource and the second time domain resource) has smaller overhead and it uses less resources than the dedicated access, and the arrangement has a higher reliability and lower latency than the contention based access.

Figure 9:
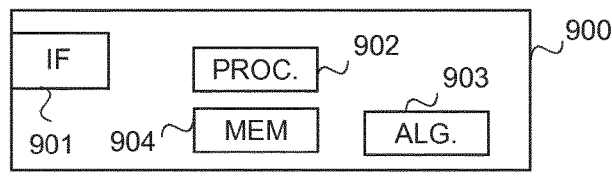
FIG. 9 is a schematic block diagram of an exemplifying apparatus.

FIG. 9 is a simplified block diagram illustrating some units for an apparatus 900 configured to participate to the distribute scheduling with TDD, i.e. an apparatus providing at least the group resource user unit and/or the assisting unit and/or the configuration unit, and/or one or more units configured to implement at least some of the functionalities described above. In the illustrated example, the apparatus comprises one or more interfaces (IF) 901 for receiving and transmitting information over the wireless interface(s), a processor 902 configured to implement at least some functionality described above with a corresponding algorithm/ algorithms 903, and memory 904 (external and/or internal) usable for storing a program code required at least for the implemented functionality and the algorithms. The memory 904 is also usable for storing other information, like the identifiers. Although the apparatuses have been depicted as one entity in FIG. 9, different modules and memory may be implemented in one or more physical or logical entities.

In other words, the apparatus may be a computing device that may be any apparatus or device or equipment configured to perform one or more of corresponding apparatus functionalities described with an embodiment/example/ implementation, and it may be configured to perform functionalities from different embodiments/examples/implementations. The unit(s) described with an apparatus may be separate units, even located in another physical apparatus, the distributed physical apparatuses forming one logical apparatus providing the functionality, or integrated to another unit in the same apparatus.

The techniques described herein may be implemented by various means so that an apparatus implementing one or more functions of a corresponding apparatus described with an embodiment/example/implementation comprises not only prior art means, but also means for implementing the one or more functions of a corresponding apparatus described with an embodiment and it may comprise separate means for each separate function, or means may be configured to perform two or more functions. For example, the group resource user unit and/or the assisting unit and/or the configuration unit, and/or algorithms, may be software and/ or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers. The computer program or software code may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

Modifications and configurations required for implementing functionality of an embodiment may be performed as one or more routines, which may be implemented as added or updated software routines, application circuits (ASIC) and/or programmable circuits. Further, software routines may be downloaded into an apparatus. The apparatus may be configured as a computer or a microprocessor, such as single-chip computer element, or as a chipset, including at least a memory for providing storage capacity used for arithmetic operation and an operation processor for executing the arithmetic operation.

It should be appreciated that an apparatus may include or otherwise be in communication with a control unit, one or more processors or other entities capable of carrying out one or more operations according to the embodiments described by means of FIGS. 3, 4, 5, 6 and/or 7. It should be understood that each block of the flowcharts and any combination thereof may be implemented by various means or their combinations, such as hardware, software, firmware, one or more processors and/or circuitry.

An example of an apparatus includes at least one processor and at least one memory including a computer program code, the at least one memory and the computer program code configured to, with the at least one processor, cause the apparatus at least to: send a first message to an apparatus belonging to a service group comprising two or more user devices over a first time domain resource that is allocated to the service group for sending and receiving addressed messages comprising recipient identifying information in a half-duplex communication, the first message being an addressed message and, in response to sending the message, monitor a second time domain resource that is allocated to the service group for forwarding collided messages, a collided message being a message which was sent to one or more recipients over such a first time domain resource which was used by at least one of the one or more recipients for sending.

Another example of an apparatus includes at least one processor and at least one memory including a computer program code, the at least one memory and the computer program code configured to, with the at least one processor, cause the apparatus at least to: monitor a first time domain resource that is allocated to a service group comprising two or more user devices for sending and receiving addressed messages in a half-duplex communication, an addressed message comprising at least recipient identifying information and, in response to detecting a first addressed message sent from a first user device to a second user device over a first time domain resource, forward one or more second addressed messages sent over the same first time domain resource and identifying the first user device as a recipient over a second time domain resource that is allocated to the service group.

The apparatus may generally include a processor, controller, control unit, micro-controller, or the like connected to a memory and to various interfaces of the apparatus. Generally the processor is a central processing unit, but the processor may be an additional operation processor. Each or some or one of the units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations/examples. In other words, each or some or one of the units and/or the algorithms described above may be an element that comprises one or more arithmetic logic units, a number of special registers and control circuits.

Further, the apparatus may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. An example of an external memory includes a removable memory detachably connected to the apparatus.

The apparatus may generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that the control information, etc. can be received and/or sent. The receiving and sending units may comprise a set of antennas, the number of which is not limited to any particular number.

Further, the apparatus may comprise other units, such as one or more timers and/or one or more user interfaces for receiving user inputs and/or outputting information to the user.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   sending, from a first apparatus belonging to a service group, a first message to a second apparatus belonging to the service group over a first time domain resource that is allocated to the service group for sending and receiving addressed messages comprising recipient identifying information in a half-duplex communication, the first message being an addressed message;
   in response to sending the first message, monitoring, by the first apparatus, a second time domain resource that is allocated to the service group for forwarding collided messages, a collided message being a message which was sent to one or more recipients over such a first time domain resource which was used by at least one of the one or more recipients for sending.

2. A method as claimed in claim 1, wherein the monitoring is performed to detect a second message identifying the first apparatus as the recipient, in case such a second message was sent over the same first time domain resource the first apparatus sent the first message.

3. A method as claimed in claim 1, further comprising:
   waiting for a response to the first message a predetermined time; and
   resending the first message over the first time domain resource if the response is not received within the predetermined time.

4. A method as claimed in claim 1, further comprising:
   triggering sending the first message in response to detecting that the first apparatus has data to be sent to another apparatus.

5. A method as claimed in claim 4, further comprising at least one of the following:
   sending the data in the first message; and
   sending the first message to request access for data transmission.

6. A method as claimed in claim 5, further comprising:
   sending the first message to request access for data transmission; and
   in response to the access being denied, using non device-to-device communication.

7. A method as claimed in claim 1, wherein the first time domain resource and the second time domain resource are for device-to-device communication.

8. A method as claimed in claim 7, further comprising:
   sending data over a third time domain resource allocated for data transmissions in half-duplex device-to-device communication.

9. A method as claimed in claim 1, further comprising:
   monitoring the second time domain a predetermined time.

10. A method as claimed in claim 1, further comprising:
    ending the monitoring in response to a next first time domain resource beginning or in response to the second time domain resource ending.

11. A method as claimed in claim 1, wherein the addressed message further comprises sender identifying information.

12. A method comprising:
    monitoring, by an apparatus, a first time domain resource that is allocated to a service group comprising two or more user devices for sending and receiving addressed messages in a half-duplex communication;
    detecting a first addressed message including at least recipient identifying information;
    in response to detecting the first addressed message sent from a first user device to a second user device over a first time domain resource, forwarding, by the apparatus, one or more second addressed messages sent over the same first time domain resource and identifying the first user device as a recipient over a second time domain resource that is allocated to the service group.

13. A method as claimed in claim 12, wherein the addressed message further comprises sender identifying information, and the method further comprises:
    comparing sender identifying information in the addressed message to the recipient identifying information in other addressed messages sent over the same first time domain resource to identify messages to be forwarded over the second time domain resource.

14. A method as claimed in claim 12, wherein the second time domain resource is allocated to the service group for forwarding collided messages, a collided message being a message which was sent to one or more recipients over such a first time domain resource which was used by at least one of the one or more recipients for sending.

15. A method as claimed in claim 12, further comprising at least one of:

the first time domain resource comprises one or more parallel resources with a first fixed time duration; and
the second time domain resource comprises one or more parallel resources with a second fixed time duration.

16. A method as claimed in claim 15, wherein the first fixed time duration of the first time domain resource is one slot and the second fixed time duration of the second time domain resource is one slot.

17. A method as claimed in claim 12, wherein a periodicity of the first time domain resource is the same as a periodicity of the second time domain resource and there is a fixed time offset between the first time domain resource and the second time domain resource.

18. A method as claimed in claim 17, wherein the first time domain resource is available in every second sub-frame in uplink control information resources, and the second time domain resource is available in every second sub-frame in downlink control resources.

19. A method as claimed in claim 18, wherein the first time domain resource and the second time domain resource form a resource pair positioned in consecutive frames.

20. An apparatus as comprising at least one processor; and one memory including computer program code, wherein the at least one memory and the computer program code are configured to, with the at least one processor, cause the apparatus to perform the method of claim 12.

21. A system comprising:
at least two first apparatuses belonging to a service group and being configured to:
use a first half-duplex time domain resource for sending and receiving addressed messages in the service group, and
monitor, in response to sending a message over the first half-duplex time domain resource, a second time domain resource allocated for the service group for forwarding collided messages; and
at least one second apparatus configured to be an assisting node to the service group and implementing a method as claimed in claim 12.

22. A system as claimed in claim 21, wherein a first apparatus is further configured to be also the second apparatus.

23. A system as claimed in claim 21 wherein the first half-duplex time domain resource is available in every second sub-frame in uplink control information resources, and the second time domain resource is available in every second sub-frame in downlink control resource.

* * * * *

UNITED STATES PATENT AND TRADEMARK OFFICE
CERTIFICATE OF CORRECTION

PATENT NO. : 9,877,335 B2  
APPLICATION NO. : 15/114668  
DATED : January 23, 2018  
INVENTOR(S) : Pajukoski et al.

Page 1 of 1

It is certified that error appears in the above-identified patent and that said Letters Patent is hereby corrected as shown below:

In the Claims

In Column 15, Line 22, Claim 20, delete "apparatus as" and insert -- apparatus --, therefor.

Signed and Sealed this  
Second Day of June, 2020

Andrei Iancu  
*Director of the United States Patent and Trademark Office*